UNITED STATES PATENT OFFICE.

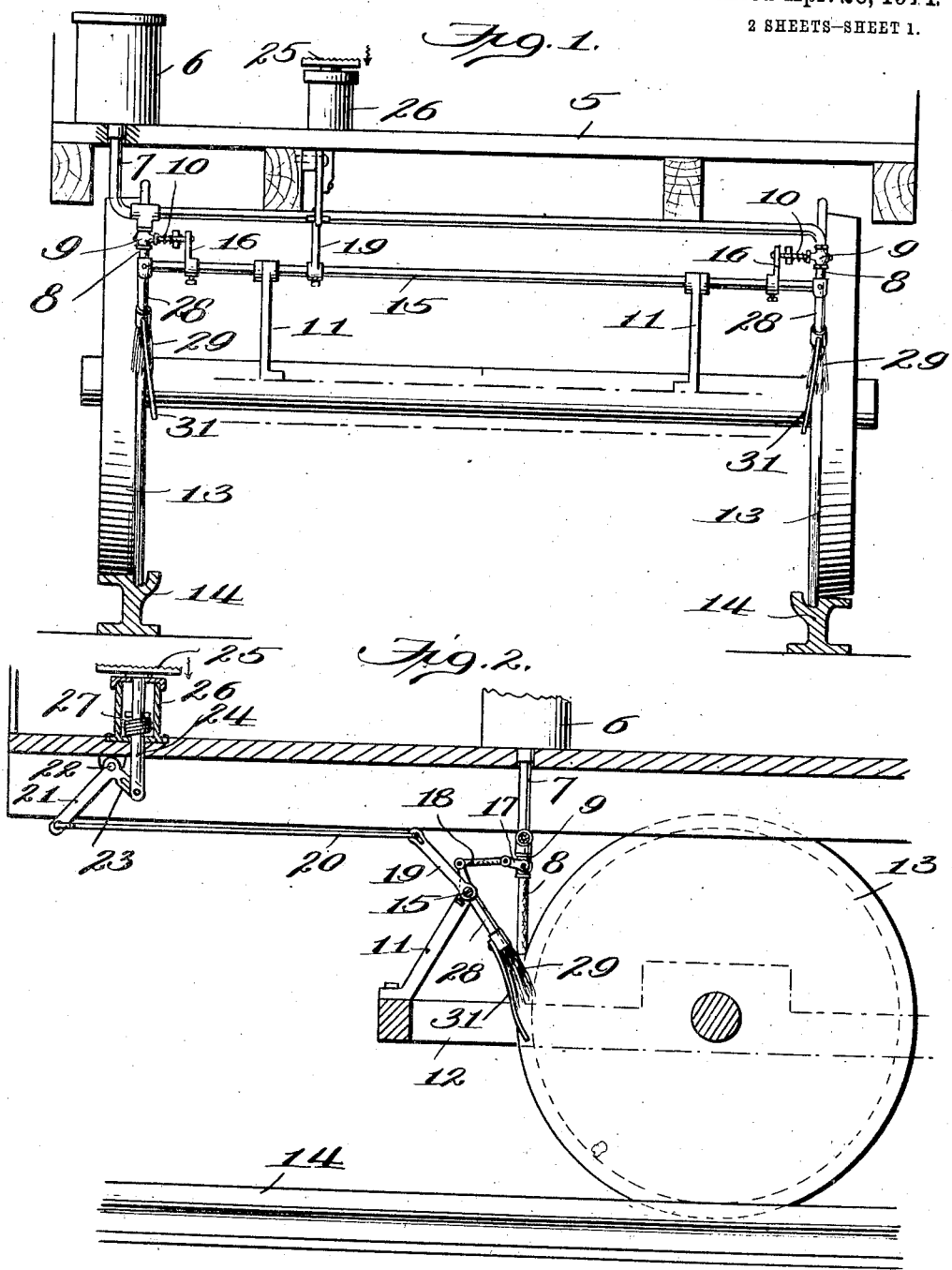

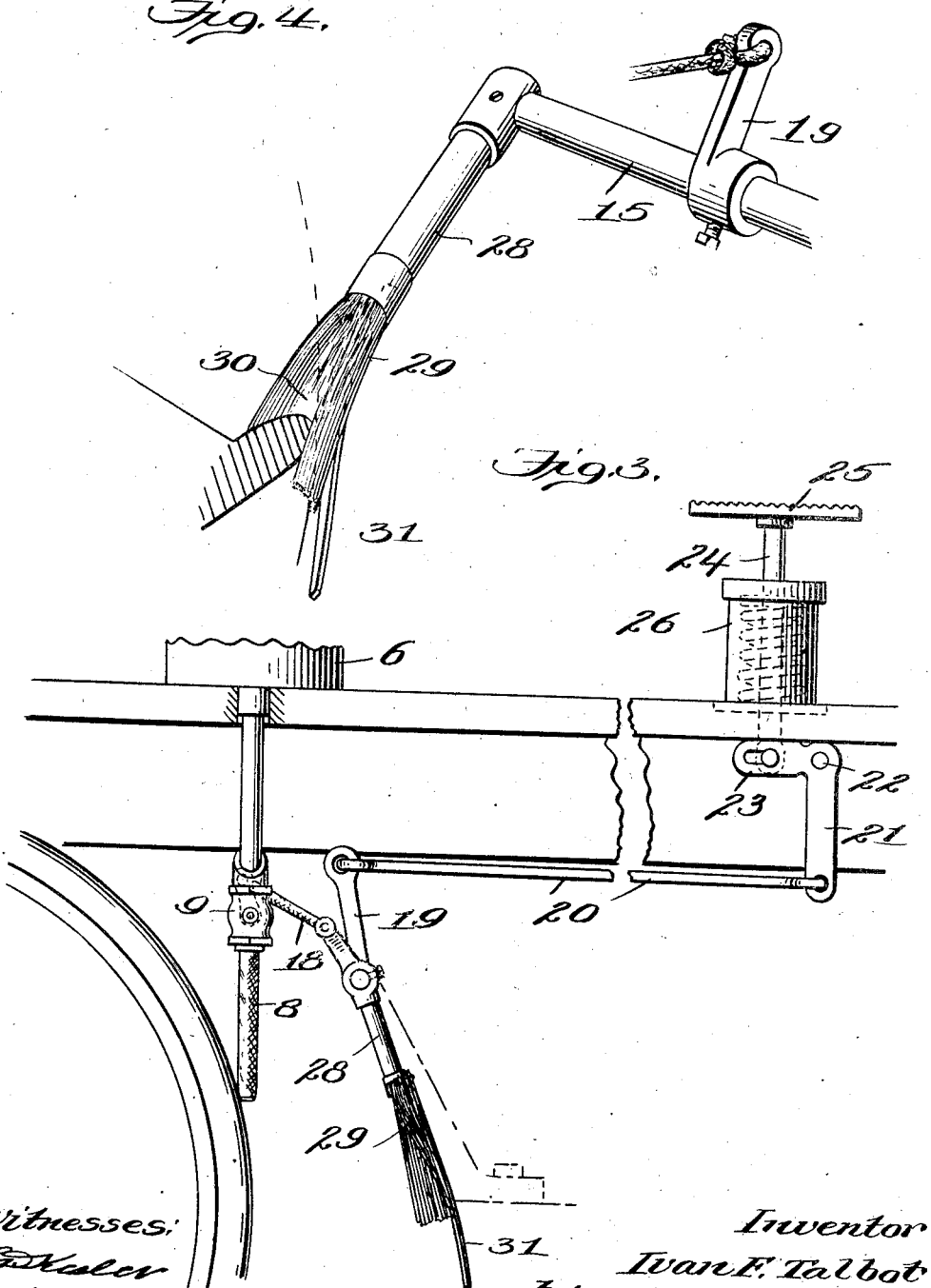

IVAN F. TALBOT, OF BOISE, IDAHO, ASSIGNOR TO ERNEST O. ATWOOD, OF BOISE, IDAHO.

LUBRICATOR.

1,095,042.  Specification of Letters Patent.  Patented Apr. 28, 1914.

Application filed December 21, 1912. Serial No. 738,087.

*To all whom it may concern:*

Be it known that I, IVAN F. TALBOT, a citizen of the United States, residing at Boise, in the county of Ada and State of Idaho, have invented new and useful Improvements in Lubricators, of which the following is a specification.

This invention relates to lubricators for oiling or greasing the flanges of the wheels of street cars, locomotives or the like so that the track rails may be lubricated at curves, switches and other points by motormen, engineers or other operatives directly from the car, locomotive or other vehicle with material economy in the use of oil or grease as well as a saving in the care of track rails by obviously reducing the number of track attendants.

The invention consists in the preferred construction and arrangement of the several parts which will be more fully hereinafter described and claimed.

In the drawings: Figure 1 is a sectional end elevation of a portion of a car bed and truck showing the features of the invention applied thereto. Fig. 2 is a longitudinal vertical section of a portion of a car bed and truck and the mechanism embodying the features of the invention, the parts being in position to supply oil to the car wheel flanges. Fig. 3 is a view similar to Fig. 2 showing the parts of the invention in normal position. Fig. 4 is a detail perspective view particularly showing one of the brushes and a part of the means for operating the same and also demonstrating the manner in which the brush engages the flange of the car wheel.

The numeral 5 designates the bed of a street car, to which the invention is particularly applicable, or of any other type of rolling stock moving over track rails.

As the invention is particularly adapted for use on street cars, the subsequent description will refer to this special application, but it will be understood that the same mechanism may be equally well applied to other types of cars or track engaging vehicles.

Disposed on the bed 5 of the car in any suitable position and under a seat or elsewhere is an oil or grease tank 6, and depending therefrom is an outlet pipe 7 suitably mounted under and extending across the under side of the bed and having flexible nozzles 8 attached to opposite portions thereof and depending therefrom, controlling valves 9 being disposed above the nozzles and having inwardly projecting spring-actuated stems 10. Bracket bearings or supports 11 are secured to a portion of the truck 12 embodying as usual flanged wheels 13 to engage track rails 14. In the upper extremities of the bearing brackets or supports 11 a shaft 15 is rotatably mounted and has upwardly projecting crank arms 16 fixed thereto and attached to arms 17 of the valve stems 10 by flexible or yielding connections 18. The shaft 15 also has a main actuating crank arm 19 attached thereto, and loosely engaged in the upper end of the said crank arm 19 is a connecting rod 20 which extends forwardly and also is loosely attached to the lower end of a long arm 21 of a bell crank 22 fulcrumed to a portion of the bed of the car and having the shorter arm 23 associated with the lower end of a depressible or foot-actuated pin or post 24 extending upwardly through the bed of the car and provided with a tread head 25 at its upper end. The pin or post 24 may be mounted in any suitable manner, but as shown it extends through a casing or sleeve 26 containing a spring 27 engaging the said pin or post and operating to restore the latter to normal position when released. Depending from the shaft 15 just ahead of the flexible feed nozzles 8 are two brush arms 28 each carrying a brush 29 at its lower end. The brushes 29 are particularly formed to engage the flanges of the car wheels 13 and are provided with V-shaped openings 30, one in each, which extend through the upper and end portions of the brushes so as to provide recesses in which the flanges of the car wheels may snugly fit and also pockets to receive the oil or grease which is delivered thereto by the nozzles 8. The lower side of each brush is closed by the brush material thereof, and when the brush engages the flange of the car wheel, as particularly shown by Fig. 4, the opposite side portions of the wheel flange as well as the periphery of the latter are closely engaged by the brush so as to prevent the oil or grease from running down over the flange from the point of application thereof and an economical and effective application of the oil or grease to the wheel flange results.

A guide arm 31 is applied to each brush and extends under the latter and outwardly beyond the same a suitable distance at an angle to the longitudinal extent of the brush. The guide arms 31 of the brushes are formed of suitable non-yielding or rigid metal and in their operation they accurately direct the brushes when they move toward the wheel flanges by engaging the inner portions of the flanges in advance of the brushes and insure the accurate disposition of the brush recesses or pockets 30 relatively to the wheel flanges under all conditions.

The shaft 15 and brushes 29 together with the arms 28 of the latter and the cranks 16 and 19 shift regularly with the truck 12, such shifting movement being permitted without injury to the operating mechanism by the loose attachment of the connecting rod 20 with the crank arm 19 and the flexible connections 18 between the crank arms 16 and the valve stem arms 17. With this structural provision in mind the operation will be readily understood and is as follows: From the normal position of the brushes and operating mechanism, as shown by Fig. 3, the brushes 29 are caused to engage the flanges of the wheels by depressing the pin or post 24 against the resistance of the spring 27, and this depression of the pin or post forces the arm 23 of the bell crank 22 downwardly and the longer arm 21 forwardly, thus pulling on the connecting rod 20 and rocking the shaft 15 in a forward direction, which will cause the brushes 29 to move rearwardly and engage the wheel flanges and simultaneously the valves 9 will be opened through a similar forward movement of the crank arms 16 and a forward pull on the flexible connections 18 between the latter crank arms and the arms 17 of the spring-actuated valve stems 10. As the valves 9 are opened the springs of the spring-actuated valve stems tightly coil or wind so that the valves will be instantly closed when the pulling tension on the arms 17 is released or relaxed. When the brushes have moved rearwardly as explained and the valves 9 simultaneously opened, the oil or grease flows down to the brushes and is deposited in the recesses or pockets 30 and applied uniformly to the opposite sides and peripheries of the wheel flanges and by said flanges the track rails are lubricated in an economical manner wherever desired and found necessary to facilitate the movement of a car around a curve or over other track organizations where the application of oil or grease may be required. When the pin or post 24 is released the parts instantly resume their normal position as shown by Fig. 3 and the brushes 29 are thrown forwardly to avoid wear thereon by continual engagement with the wheel flanges, and, furthermore, it will be understood that the delivery of the oil or grease within the recesses or pockets 30 of the brushes reduces the wear on the brushes when they are in contact or in engagement with the wheel flanges in view of the fact that the brushes themselves are lubricated and the friction thereon consequently materially reduced. Furthermore, by having the brushes embrace the wheel flanges as specified they will have a more prolonged engagement with the wheel flanges in a practical manner in view of the fact that the slight wear thereon that may ensue from continued use will not detract to any appreciable extent from a reliable engagement of the brushes with the wheel flanges. When the brushes have in course of time become materially worn they may be replaced at a minimum expense without disorganizing the remaining mechanism as it is proposed to apply the brushes in such manner that they may be readily removed from the shaft 15 when desired.

The improved lubricating mechanism or appliance will be found exceptionally advantageous for the purpose for which it has been devised, and to accommodate various applications it will be understood also that changes in the proportions, dimensions and minor details may be resorted to without departing from the spirit of the invention.

What is claimed is:

1. A lubricating appliance for car wheel flanges comprising a lubricant feeding pipe having valves and outlet means depending adjacent to the wheel flanges, brushes independent of the outlet means and movable toward and from the wheel flanges, the brushes when applied to the wheel flanges engaging the peripheries at opposite sides of the latter, and mechanism carrying the brushes and connected to the said valves for simultaneously opening the latter and applying the brushes to the wheel flanges, the upper sides of the brushes when applied being open to receive the lubricant and fit the wheel flanges.

2. The combination with a car having a truck with flanged wheels, of a lubricating mechanism for the wheel flanges consisting of a feed pipe for the lubricant provided with depending nozzles and valves, brushes having a rocking movement relatively to the wheel flanges and independent of the said feed pipe, and mechanism for simultaneously operating the brushes to bring the latter into engagement with the peripheries and opposite side portions of the wheel flanges and for opening the valves, the upper sides of the brushes when applied being open to receive the lubricant and fit the wheel flanges, the valves being provided with means for closing the same the moment the brushes are disengaged from the wheel flanges.

3. In a car, the combination with a car body and movable truck having flanged wheels, of a feed pipe for the lubricant carried by the car body and provided with supply means and also with valves and nozzles depending therefrom adjacent to the flanges of the wheels, a rock shaft carried by the truck and having flexible connections to the valves and also provided with operating means controllable from the bed of the car and in loose association therewith, and brushes fixed to the said rock shaft and movable simultaneously toward the flanges of the wheels when the valves are opened by the rock shaft, the brushes being independent of the feed pipe, the valves and the brushes being instantly restored to normal position or respectively closed and moved away from the flanges of the car wheels when the rock shaft is released, the upper sides of the brushes when applied being open to receive the lubricant and to fit the wheel flanges.

4. In a lubricating device for car wheel flanges, an oil feeding nozzle depending adjacent to each wheel flange, and swinging brushes normally disengaged from the wheel flanges and having longitudinal pockets preliminarily formed therein and opening outwardly through the sides thereof adjacent to the car wheel flanges, the said pockets corresponding to the contour of the wheel flanges for snugly receiving the latter, the oil being deposited by the nozzles in the pockets when the brushes are in engagement with the wheel flanges.

5. In a lubricating device for car wheel flanges, a brush for each wheel flange having a pocket extending longitudinally throughout the length thereof and opening outwardly through the side adjacent to the wheel flange and also continuing through the free end of the brush, the pocket being preliminarily formed in the brush and having the portion thereof opposite the pocket fully closed by the brush material to closely engage the opposite sides and periphery of the flange to hold the lubricant against waste by running downwardly over the flange below the brush, and a flexible lubricant feeding nozzle terminating close to each car wheel flange above the point of application of the brush thereto.

6. In a lubricating device for car wheel flanges, a brush provided with a longitudinal pocket opening outwardly through one side thereof and also with means for moving the same into contact with and disengaging it from the wheel flange, and a guide arm secured to and projecting beyond the brush to engage a portion of the wheel to accurately apply the brush to the wheel flange.

7. In a lubricating device for car wheel flanges, a brush provided with means for moving the same into contact with and disengaging it from the wheel flange and having a pocket shaped to receive the wheel flange therein, and a guide arm secured to and depending under and projecting beyond the brush to one side of the longitudinal center of the latter for accurately positioning the brush relatively to the wheel flange and to insure the entrance of the latter into the pocket of the brush.

In testimony whereof I have hereunto set my hand in presence of two subscribing witnesses.

IVAN F. TALBOT.

Witnesses:
CHAS. S. HYER,
JAMES L. NORRIS.